(12) United States Patent
Thomas et al.

(10) Patent No.: US 8,044,842 B2
(45) Date of Patent: Oct. 25, 2011

(54) HIGH ACCURACY RADAR ALTIMETER USING AUTOMATIC CALIBRATION

(75) Inventors: Steven H. Thomas, Brooklyn Center, MN (US); Timothy J. Reilly, Plymouth, MN (US); Glen B. Backes, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 143 days.

(21) Appl. No.: 12/489,633

(22) Filed: Jun. 23, 2009

(65) Prior Publication Data

US 2009/0262008 A1      Oct. 22, 2009

Related U.S. Application Data

(62) Division of application No. 11/462,901, filed on Aug. 7, 2006, now abandoned.

(51) Int. Cl.
*G01S 13/08* (2006.01)
*G01S 7/40* (2006.01)

(52) U.S. Cl. .................................. 342/120; 342/174
(58) Field of Classification Search ............. 342/120
See application file for complete search history.

(56) References Cited

U.S. PATENT DOCUMENTS

| | | | |
|---|---|---|---|
| 2,655,651 A | 10/1953 | Allen, et al. | |
| 3,271,763 A * | 9/1966 | Colby, Jr. | 342/88 |
| 3,544,996 A | 12/1970 | Pile | |
| 3,774,206 A | 11/1973 | Rauch | |
| 3,895,383 A * | 7/1975 | Korman | 342/95 |
| 4,121,213 A | 10/1978 | Bush et al. | |
| 4,179,694 A * | 12/1979 | Alder | 342/100 |
| 4,241,346 A * | 12/1980 | Watson | 342/74 |
| 4,538,150 A | 8/1985 | Bone, Jr. | |
| 4,661,818 A | 4/1987 | Riffiod et al. | |
| 4,679,168 A | 7/1987 | Conway et al. | |
| 4,683,473 A | 7/1987 | Haugland | |
| 4,806,935 A | 2/1989 | Fosket et al. | |
| 4,945,360 A | 7/1990 | Trummer et al. | |
| 5,014,063 A * | 5/1991 | Studenny | 342/130 |
| 5,150,125 A * | 9/1992 | Hager | 342/120 |
| 5,160,933 A | 11/1992 | Hager | |
| 5,300,934 A | 4/1994 | Asbell et al. | |
| 5,410,317 A * | 4/1995 | Ostrom et al. | 342/65 |
| 5,477,226 A | 12/1995 | Hager et al. | |
| 5,801,601 A | 9/1998 | Gayle | |
| 5,952,961 A * | 9/1999 | Denninger | 342/357.3 |
| 6,476,759 B2 | 11/2002 | Orlandi | |

(Continued)

FOREIGN PATENT DOCUMENTS

JP      363040884      2/1998

*Primary Examiner* — Thomas H. Tarcza
*Assistant Examiner* — Matthew M Barker
(74) *Attorney, Agent, or Firm* — Fogg & Powers LLC (57) ABSTRACT

A method of compensating for component errors within a radar altimeter is described. The method includes periodically switching transmit pulses from a transmit antenna to a programmable delay device, calculating an altitude based on a transmit pulse received from the programmable delay device, comparing the calculated altitude to an expected altitude, the expected altitude based on a pre-set delay through the programmable delay device, and compensating an altitude measured by the radar altimeter, based on transmit pulses output through the transmit antenna, by an error correction amount based on a difference between the calculated altitude and expected altitudes.

11 Claims, 5 Drawing Sheets

U.S. PATENT DOCUMENTS

| | | |
|---|---|---|
| 6,812,885 B2 | 11/2004 | Brettner, III et al. |
| 7,075,478 B2 | 7/2006 | Hager et al. |
| 7,095,364 B1 * | 8/2006 | Rawdon et al. ............... 342/120 |
| 7,095,488 B2 * | 8/2006 | Jamieson et al. ............ 356/5.01 |
| 2006/0017609 A1 | 1/2006 | Hager et al. |
| 2007/0085727 A1 * | 4/2007 | Backes et al. .................. 342/68 |

* cited by examiner

HIGH ACCURACY RADAR ALTIMETER USING AUTOMATIC CALIBRATION

CROSS REFERENCE TO RELATED APPLICATIONS

This application is a divisional of U.S. patent application Ser. No. 11/462,901, filed on Aug. 7, 2006 and entitled "HIGH ACCURACY RADAR ALTIMETER USING AUTOMATIC CALIBRATION" (the '901 application). The '901 application is incorporated herein by reference.

BACKGROUND OF THE INVENTION

This invention relates generally to radar altimeters, and more specifically, to methods and systems that improve radar altimeter accuracy.

The proper navigation of an aircraft in all phases of its flight is based to a large extent upon the ability to determine accurately the height above terrain over which it is passing, and further based on the ability to determine a position of the aircraft. In this regard, aircraft instrumentation, sensors, radar systems, and specifically, radar altimeters are used in combination with accurate electronic terrain maps. The electronic terrain maps provide the height of objects on the map, and together with the radar altimeter aid in the flight and the planning of a flight path for the aircraft.

As such, radar altimeters are commonly implemented within aircraft. A radar altimeter typically includes a transmitter for applying pulses of electromagnetic energy at regular intervals to an antenna which then radiates the energy, in the form of a transmit beam, towards the earth's surface. A transmit beam from a radar is sometimes said to "illuminate" or "paint" an area which reflects the transmit beam. Based on a configuration of the antenna, the transmit beam includes a main lobe, and one or more side lobes which are separated from the main lobe by an angle.

The radar altimeter further includes a signal receiver which receives return pulses, sometimes referred to as an echo or a return signal. Return pulses are received at a receive antenna, and constitute the transmitted beams that have been reflected from the earth's surface. It is known that some radar altimeters utilize the same antenna for both transmitting and receiving. A closed loop servo tracker for measuring the time interval between the transmitted pulse and its associated return pulse also forms a part of the radar altimeter. The time interval between the transmit pulse and the return pulse is directly related to the altitude of the aircraft.

Many aircraft require better accuracy from a radar altimeter than presently exists. Generally, the accuracy becomes more important at low altitudes where aircraft require controlled flight into and just above terrain, for example, during landing, low altitude equipment drops, precision hovering, detection avoidance, and nap of the earth flying. Some of these applications include unmanned vehicles where landing is controlled remotely and there is little room for error. The low altitude region of a radar altimeter, where the accuracy becomes more important, is usually defined as from 0 to 50 feet. Laser systems have been proposed but problems, for example, with weather, errors relative to aircraft attitude with a collimated beam, and inability to see through dust, rain, fog and other environments have negated their use for critical radar altimeter applications.

The total accuracy of a radar altimeter system is a function of sensor accuracy and ground return signal accuracy. Sensor accuracy is diminished by variations due to environmental changes, including but not limited to changes in temperature and humidity, and affected by variations in signal amplitude, risetime, bandwidths, pulse or gate widths, and clock frequencies.

In contrast to sensor accuracy where the error is caused by variations within the radar altimeter system, ground return signal accuracy is a function of the radar signal from when it leaves a transmit antenna to when it is received at a receive antenna. Ground return signal errors are caused by vehicle attitude, the external environment including but not limited to rain, fog, and dust, and terrain characteristics and associated reflection coefficient characteristics including shaping functions. The above described errors are difficult to detect and correct in a radar altimeter. As a result, wide accuracy tolerances are utilized to account for the various error sources.

BRIEF DESCRIPTION OF THE INVENTION

In one aspect, a method of compensating for component errors within a radar altimeter is provided. The method comprises periodically switching transmit pulses from a transmit antenna to a precision programmable delay device, calculating an altitude based on a transmit pulse received from the programmable delay device, comparing the calculated altitude to an expected altitude, the expected altitude based on a pre-set delay through the programmable delay device, and compensating an altitude measured by the radar altimeter, based on transmit pulses output through the transmit antenna, by an error correction amount based on a difference between the calculated altitude and expected altitudes.

In another aspect, a radar altimeter is provided. The radar altimeter comprises a programmable delay device configured to periodically delay a received signal by a set time delay. The radar altimeter further comprises a switching device configured to switch transmit pulses of the radar altimeter between a transmit antenna and the programmable delay device. The radar altimeter still further comprises a processing device configured to: (1) control operation of the switching device, (2) calculate an altitude based on the transmit pulse received from the programmable delay device and compare the calculated altitude to an expected altitude, the expected altitude based on a pre-set delay through the programmable delay device, and (3) compensate an altitude measured by the radar altimeter, based on transmit pulses output through the transmit antenna, based on a difference between the calculated altitude and expected altitudes.

In another aspect, a calibration unit for an RF transmitting and receiving device is provided. The calibration unit comprises a programmable delay device configured to periodically delay a received signal by a set time delay. The calibration unit further comprises a switching device configured to switch RF pulses between a transmit antenna and the programmable delay device. The calibration still further comprises a processing device configured to: (1) control operation of the switching device, (2) calculate a result based on the RF pulse received from the programmable delay device and compare the result to an expected result, the expected result based on a set time delay through the programmable delay device, (3) compensate a result measured by said RF transmitting and receiving device, based on RF pulses output through the transmit antenna, based on a difference between the calculated result and expected results, and (4) communicate with systems external to the RF transmitting and receiving device.

In another aspect, a method of reducing ground return signal errors affecting an accuracy of a radar altimeter is provided. The method comprises determining errors in an altitude output of the radar altimeter based on time variations of received ground return pulses and adjusting operating parameters of the radar altimeter to reduce errors, adjusting based on at least one of pitch, roll, and pulse width.

In still another aspect, a radar altimeter is provided. The radar altimeter is configured to adjust operating parameters of said radar altimeter, based on at least one of varying pulse widths of transmit pulses, varying vehicle attitudes, and varying vehicle altitudes, to reduce ground return signal errors.

In still another aspect, a processing device is provided. The processing device is configured to reduce ground return signal errors of a radar altimeter and adjust operating parameters of the radar altimeter based on at least one of varying pulse widths of transmit pulses, varying vehicle attitudes, and varying vehicle altitudes.

DETAILED DESCRIPTION OF THE INVENTION

The present invention provides methods and systems that improve radar altimeter accuracy. In one embodiment, to increase sensor accuracy, a programmable delay device is employed that is configured to automatically provide common mode compensation for any variations or errors in the sensors. To increase ground return signal accuracy, the radar altimeter incorporates additional characteristics which provide compensation as a function of antenna attitude.

Figure 1:
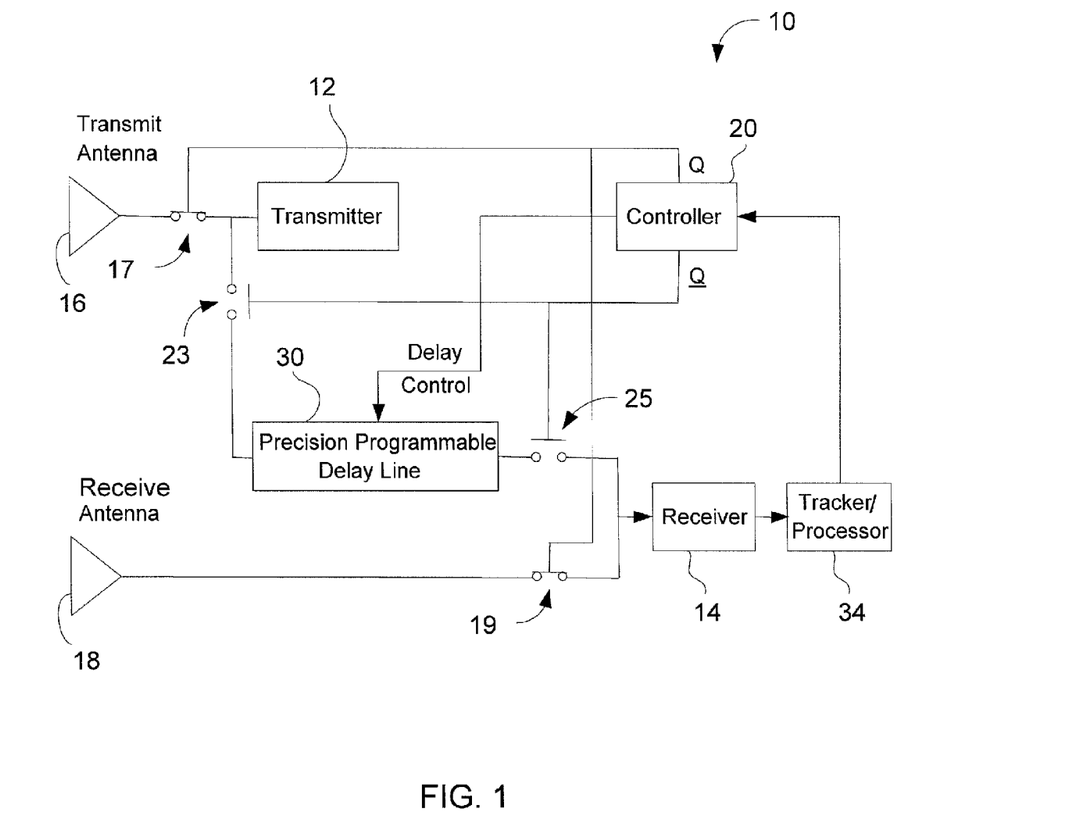
FIG. 1 is a block diagram of a radar altimeter that includes a delay device.

Referring now to the drawings, FIG. 1 is a block diagram of a radar altimeter 10. Radar altimeter 10 includes a transmitter 12 and a receiver 14. Transmitter 12 is connected to a transmit antenna 16 through a switch 17, and receiver 14 is connected to a receive antenna 18 through a switch 19. A controller 20 controls switches 17, 19, 23, and 25 within radar altimeter 10 and also provides a delay control to a programmable delay device 30 according to instructions from a tracker/processor 34. Tracker/processor 34 receives signals from receiver 14 and is programmed to provide receiver data to external systems 36. In one embodiment, external systems 36 includes display instruments.

Referring now to the drawings, FIG. 1 is a block diagram of a radar altimeter 10. Radar altimeter 10 includes a transmitter 12 and a receiver 14. Transmitter 12 is connected to a transmit antenna 16 through a switch 17, and receiver 14 is connected to a receive antenna 18 through a switch 19. A controller 20 controls switches 17, 19, 23, and 25 within radar altimeter 10 and also provides a delay control to a programmable delay device 30 according to instructions from a tracker/processor 34. Tracker/processor 34 receives signals from receiver 14 and is programmed to provide receiver data to external systems.

Delay device 30 is part of a system that provides compensation for any variations or errors within the sensors, for example, receiver 14, antenna 18, and the interconnections therebetween. To achieve the compensation, transmitter 12 is configured to periodically send a transmit signal to delay device 30, rather than transmit antenna 16. The transmit signal is delayed by a known time interval to simulate normal operation of radar altimeter 10. More specifically, the time the signal is delayed is a simulation of the time interval between when a signal leaves transmit antenna 16, is reflected off a surface, and received at receive antenna 18. Although this is a simulation of the normal operation of radar altimeter 10, delay device 30 eliminates all sources of errors other than sensor errors. The time interval between when a transmit signal leaves transmit antenna 16 and is received by receive antenna 18 corresponds to a specific altitude. If the time interval is set and accurately reproduced by delay device 30, but radar altimeter 10 does not display the altitude that should correspond with that set time interval, there are one or more sensor errors within radar altimeter 10. In one specific embodiment, if programmable delay device 30 is set by tracker/processor 34 for a delay of 9.6 nanoseconds (nsec), since a transmitted radar signal takes 2.0334 nsec to travel one foot, this delay represents a simulated altitude of 4.72 feet.

The sensor errors discussed above may cause the radar altimeter to display an altitude that does not correspond to the actual altitude that, according to the mathematics of radar altimeter operation, should be displayed for a set delay interval. Delay device 30, in combination with processor 34, compensates for the sensor errors. In one embodiment, a calibration algorithm within processor 34 compensates for the sensor errors at a multitude of calibration altitudes. Radar altimeter 10 uses the calibration algorithm to adjust a measured altitude to remove the sensor errors. In one specific embodiment, delay device 30 is programmed in 0.010 nsec increments that can range from delay intervals of 9.6 nsec to 90 nsec. These delay intervals correspond to altitudes from 4.72 feet to 44 feet which simulate the low altitude region of a radar altimeter. The 0.010 nsec delay increments correspond to 0.0049 foot altitude increments (i.e. simulated altitudes every 0.0049 feet). Sensor errors are determined at each simulated altitude, stored in a memory, and in combination with the sensor errors determined at the other simulated altitudes a calibration algorithm is created that is continuous throughout the low altitude range.

Because of limited processing time, a select number of simulated altitudes are chosen. In one specific embodiment, eight calibration points are processed to provide five foot increments. Curve fitting utilizing, for example, linear or quadratic algorithms, provides a very accurate calibration algorithm in the low altitude region.

In one specific embodiment, if delay device 30 is set to 20.334 nsec, with no errors, the radar altimeter should display an altitude of ten feet. If, after receiving a pulse delayed by 20.334 nsec the radar altimeter displays an altitude of nine feet, sensor errors are causing a one foot variance. When delay device 30 is not connected, and a return signal is being received at receiver 14, if the radar altimeter measures that it is at an altitude of ten feet, the calibration algorithm will be applied, removing the one foot of sensor errors, and the radar altimeter will display an altitude of eleven feet. The one foot difference is caused by errors or variations in receiver 14 and processor 34, for whatever reason. The errors are common mode compensated because a known precision signal is periodically measured and any variance will also be in the actual altitude measurement since they are both processed in the same circuitry.

Delay device 30 provides a very accurately delayed pulse to receiver 14. In one specific embodiment, the accuracy of delay device 30 is less than 0.7 nsec from −40° C. to 85° C. This accuracy corresponds to a variance of 0.35 feet.

Figure 2:
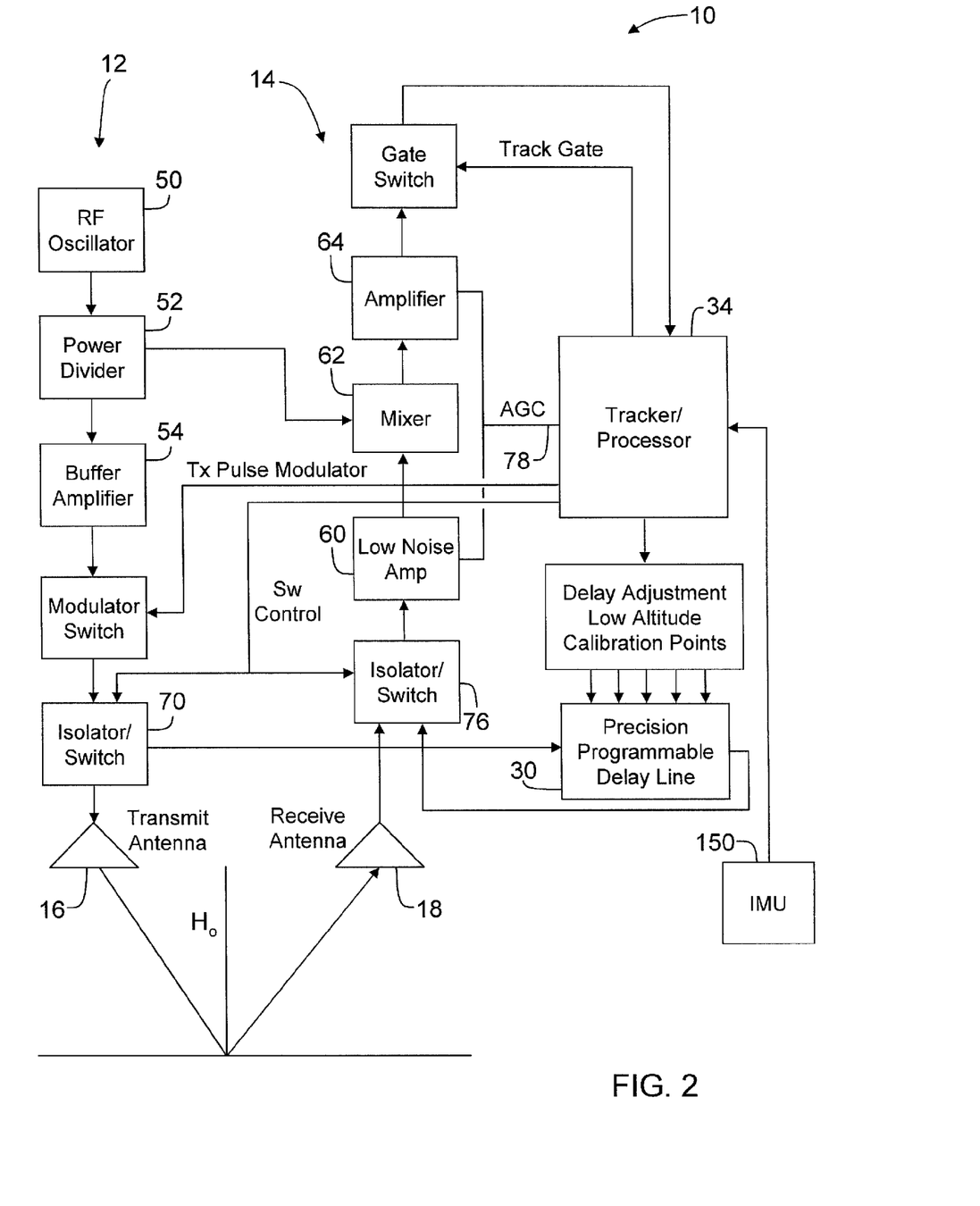
FIG. 2 is a more detailed block diagram of a radar altimeter that includes a delay device.

FIG. 2 is a more detailed block diagram of radar altimeter 10 including programmable delay device 30. As shown in FIG. 2, transmitter 12 includes a radio frequency (RF) oscillator 50, a power divider 52, and a buffer amplifier 54. FIG. 2 shows that receiver 14 includes a low noise amplifier 60, a mixer 62, and an amplifier 64. RF oscillator 50 and power divider 52 provide mixer 62 with a RF frequency to demodulate received radar signals. Isolator/switch 70 periodically switches transmit pulses from transmitter 12 from antenna 16 to delay device 30. Isolator/switch 70 switches the destination of the transmit pulses at a pulse repetition frequency. In one specific embodiment, the pulse repetition frequency is 100 KHz. At the pulse repetition frequency, the transmit pulse is switched from antenna 16 (i.e. normal operation) to delay device 30 for operation of radar altimeter 10 in the simulated mode. Delay device 30 stays at a first set delay value for a fixed number of pulses, changes to a second set delay value for a fixed number of pulses, and continues this sequence until the maximum delay is reached. After the fixed number of pulses at the maximum delay, delay device 30 changes back to the first set delay value. The fixed number of pulses at each delay value is a function of the integration period needed to track and measure the simulated altitude at that particular delay value.

Delay device 30 delays the transmit pulses for a number of clock pulses set by tracker/processor 34. The number of clock pulses set by tracker/processor 34 is varied to provide data over a range of times corresponding to a range of altitudes within the low altitude portion of radar altimeter 10. Delay device 30 sends the delayed transmit pulse to isolator/switch 76 and to receiver 14. Receiver 14 provides the delayed pulse to tracker/processor 34. From the collected data, tracker/processor 34 creates a compensation algorithm, using for example, linear or quadratic algorithms, which includes error correction values for all altitudes within the low altitude region of the altimeter. These algorithms are utilized to compensate the radar altimeter's readings, essentially making the radar altimeter independent from errors in the sensors caused by temperature and humidity changes. Tracker/processor 34 provides an automatic gain control (AGC) 78, which is discussed further below.

The second component affecting the total accuracy of radar altimeter 10 is ground return signal accuracy. This accuracy component is a function of the radar signal from when it leaves a transmit antenna 16 to when it is received by a receive antenna 18. In one embodiment, a computer is programmed to utilize a radar return integral to analyze the ground return signal and calculate the desired loop sensitivity as well as determine the accuracy of radar altimeter 10 for various configurations of altitudes, attitudes, reflection coefficients, pulse widths, and antenna patterns. Signal loss, and therefore altimeter sensitivity requirements, and predicted accuracy can be obtained from this integral, which follows:

$$Pr = \frac{PtGa^2(0)\lambda^2\sigma(0)}{(4\pi)^3 H^2} \int_0^{\beta(ct/H)} \int_0^{2\pi} [fant(\theta p, \theta r)]^2 \sigma o(\beta)\sin(\beta)\cos(\beta)d\psi d\beta.$$

The integral illustrates that the power at the receiver, Pr, is a function of $\beta(ct/H)$, and where Pt is a transmit power, H is height (i.e., altitude), $\beta$ is an angle of incidence, $\sigma(0)$ is a scattering coefficient at vertical incidence, $\sigma o(\beta)$ is a normalized scattering coefficient, $[\sigma(\beta)=\sigma(0)\sigma o(\beta)]$, $fant(\theta p, \theta r)$ is a normalized antenna pattern where receive and transmit antennas are assumed to be identical and collimated, i.e., the antenna spacing is ignored relative to H, Ga(0) is an antenna boresight gain, $\psi$ is an azimuth location angle, $\lambda$ is a wavelength, c is a velocity of propagation, and t is a time from the very first nadir return's arrival at the receive antenna.

Simulating the radar return signal utilizing the radar return integral enables a higher accuracy to be obtained within an altimeter, specifically when the altimeter is configured to optimize the characteristics identified by the simulations as leading to the highest accuracy. Specifically, the operating frequency is chosen to minimize environmental effects on the transmit and return signals. For example, the proper operating frequency can result in a reduction in the effects of reflections from rain, fog, and dust. In one specific embodiment, 4.3 GHz is utilized as the operating frequency. This operating frequency provides good weather penetration and is a high enough frequency to allow practical antenna aperture sizes.

Computer simulations of the radar return integral illustrate that narrow transmit pulses result in altitude determinations having a high degree of accuracy. In an example embodiment, transmit pulses of 10 nsec are utilized in low altitude regions (i.e., 0 to 50 feet). Since bandwidth is proportional to the inverse of pulse width, when a narrower transmit pulse is transmitted, it is desirable for a receiver to be able to support a wider bandwidth. For a high accuracy radar altimeter, the bandwidth of the receiver is configured to support narrow transmit pulses so that the leading edge of the return pulse is not distorted and result in inaccuracies.

The radar return integral also illustrates that the best accuracy from a radar altimeter is obtained when an antenna beamwidth is matched to the vehicle attitude requirements. Wide beam antennas are utilized to obtain high accuracy altimeter readings in vehicles subject to large rolling or pitching. Narrow beam antennas allow for high accuracy altimeter readings in vehicles with minimal roll or pitch. Accuracy is most important in the low altitude region where generally, roll and pitch are held to a minimum. In an example embodiment, either switchable beamwidth or steerable beamwidth antennas are utilized where the beamwidth is switched or programmed as a function of vehicle roll or pitch requirements. Incorporating these types of antennas keeps the maximum gain toward the ground and will improve accuracy and increase the ground return signal amplitude.

The radar return integral is utilized to solve for the power at receiver 14 as a function of transmit power, altitude, antenna characteristics, scattering coefficient, and aircraft attitude, which includes roll and pitch conditions. The radar return integral is also utilized to solve for loop attenuation between the signal received and the signal transmitted.

Figure 3:
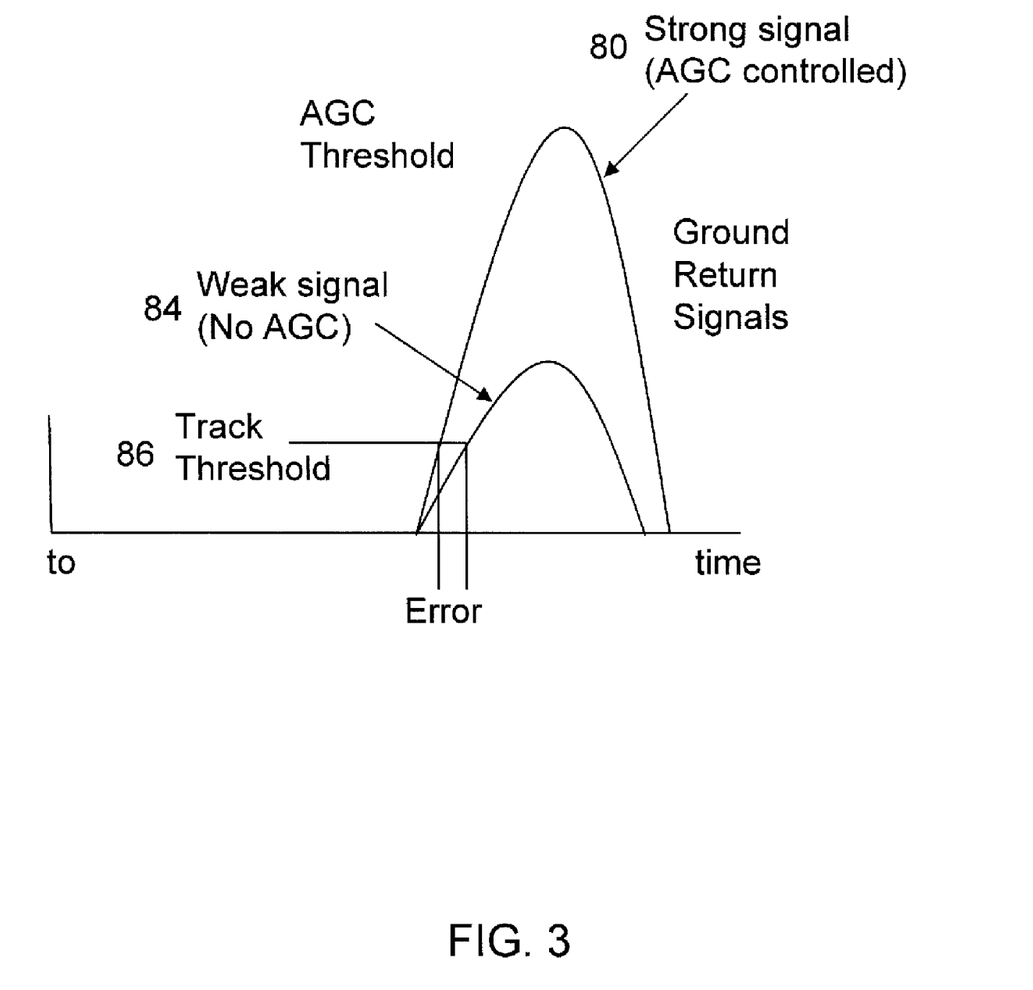
FIG. 3 is a plot of the amplitude over time of two return signals.

FIG. 3 is a plot of the amplitude over time of two return signals. The amplitude of a return signal 80 is sufficient for operation of AGC 78 (shown in FIG. 2). The amplitude of a return signal 84 is attenuated below the AGC 78 threshold, but is of sufficient amplitude to be above the track threshold 86 of the receiver. FIG. 3 shows return signal 84 reaching track threshold 86 at a later time than return signal 80. Therefore, radar altimeter 10 will convert the travel time of return signal 84 to a higher altitude than that of return signal 80, and return signal 84 will include an outbound error.

The radar return integral illustrates that the highest accuracy from a radar altimeter is obtained when the ground return signal has sufficient amplitude for AGC 78 to function. AGC 78 maintains constant amplitude regardless of amplitude variations caused by space loss, antenna characteristics, and varying ground reflection coefficients. The constant amplitude minimizes variances in the ground return leading edge risetime. The leading edge is the part of the pulse used to measure the time delay between transmit pulse and the ground return pulse. This time delay is converted to altitude in the radar altimeter.

Figure 4:
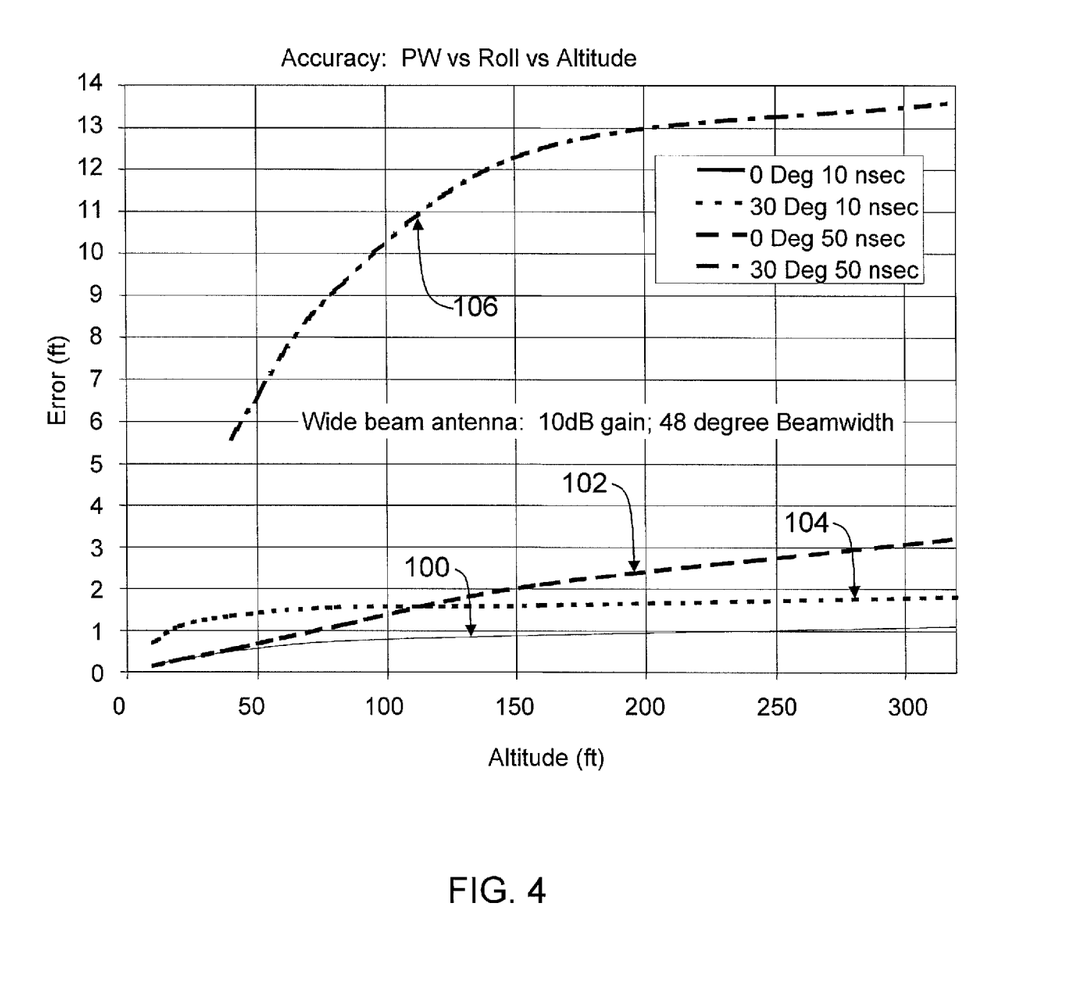
FIG. 4 is a plot of ground return signal errors as a function of altitude for various pulse widths and attitudes (roll).

FIG. 4 is a plot of ground return signal errors as a function of altitude for various pulse widths and attitudes (roll). FIG. 4 illustrates the results of ground return signal error analysis, using the return integral simulation, to reflect accuracy of radar altimeter data as a function of both transmitter pulse width and vehicle roll or pitch. To form the plots of FIG. 4, multiple plots of the type shown in FIG. 3 are derived utilizing the ground return integral computer simulations. The plots of the type shown in FIG. 3 illustrate the shape of the ground return pulse. Based on the plots of FIG. 3 and knowing tracking thresholds, errors are determined based on time variations of the return ground pulse at the tracking threshold. The errors calculated from multiple plots showing the shape of the ground return pulse (i.e., plots according to FIG. 3) are compiled in FIG. 4. These plots do not include all of the system errors. They represent the errors relative to the ground return signal. Plot 100 shows the error in feet at varying altitudes in an embodiment where the transmitter pulse width is 10 nsec and the vehicle roll is zero degrees. Plot 102 shows the error in feet at varying altitudes in an embodiment where the transmitter pulse width is 50 nsec and the vehicle roll is zero degrees. Plot 104 shows the error in feet at varying altitudes in an embodiment where the transmitter pulse width is 10 nsec and the vehicle roll is 30 degrees. Plot 106 shows the error in feet at varying altitudes in an embodiment where the transmitter pulse width is 50 nsec and the vehicle roll is 30 degrees.

The low altitude errors, more specifically, the ground return signal errors in the altitudes from 0 to 50 feet, are very low. In this embodiment, the accuracy with a narrow transmit pulse width (i.e. 10 nsec) is less than 0.6 feet with no roll and less than 1.5 feet at a 30 degree roll. In the low altitude region, rolls or pitches to 30 degrees are unlikely to occur.

Referring once again to FIG. 2, in one specific embodiment, radar altimeter 10 is configured to receive inertial data from an inertial measurement unit (IMU) 150. Additional compensation is made by inputting information from IMU 150 to radar altimeter 10. As shown in FIG. 4, ground return signal errors will always be outbound (i.e. indicate a higher altitude than the actual altitude). The errors will always be outbound because either the ground return signal rise time is close to the transmit signal rise time, which occurs when a vehicle is over a surface with high reflectivity, or the ground return signal rise time increases due to integration of the pulse due to reflection off a surface with less reflectivity. For example, a surface with high reflectivity is water, and a surface with less reflectivity is farm land.

Figure 5:
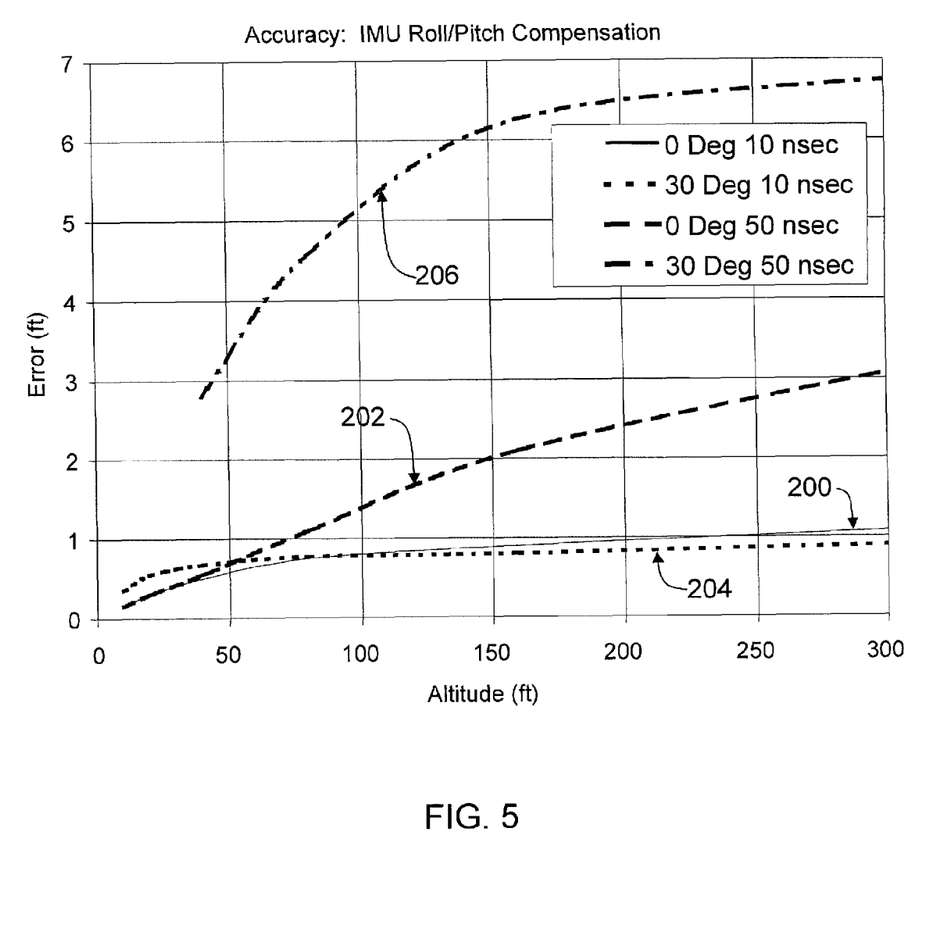
FIG. 5 is a plot of ground return signal error as altitude, pulse width, and attitude change, with ground return signal error compensation activated.

FIG. 5 is a plot of the ground return signal errors as altitude, pulse width, and attitude change, with ground return signal error compensation activated. FIG. 5, where IMU compensation is included, illustrates the reduction in ground return signal errors as compared to the ground return signal errors shown in FIG. 4. The radar altimeter is compensated as a function of the roll or pitch measured by IMU 150 to reduce the uncompensated errors. Plot 200 shows the error in feet at varying altitudes in an embodiment where the transmitter pulse width is 10 nsec, the vehicle roll is zero degrees, and ground return signal error compensation is activated. Plot 202 shows the error in feet at varying altitudes in an embodiment where the transmitter pulse width is 50 nsec, the vehicle roll is zero degrees, and ground return signal error compensation is activated. Plot 204 shows the error in feet at varying altitudes in an embodiment where the transmitter pulse width is 10 nsec, the vehicle roll is 30 degrees, and ground return signal error compensation is activated. Plot 206 shows the error in feet at varying altitudes in an embodiment where the transmitter pulse width is 50 nsec, the vehicle roll is 30 degrees, and ground return signal error compensation is activated. In one embodiment, with a narrow pulse (i.e. 10 nsec), the errors at 30 degrees are substantially reduced (i.e. from approximately 1.5 feet to 0.8 feet) at a 50 foot altitude and the errors are even lower at lower altitudes.

The computer simulations utilizing the radar return integral further illustrate that the highest accuracy from a radar altimeter is obtained when there is a significant sensitivity margin throughout the low altitude region. Antennas with good antenna isolation and adequate antenna separation minimize the leakage signal and provide a significant sensitivity margin. In one specific embodiment, a sensitivity margin of at least 10 dB is utilized.

By applying the above described delay device and producing and operating a radar altimeter with the above described characteristics, the accuracy in the low altitude region (i.e., 0 to 50 feet) is less than 0.6 feet (as shown in FIG. 5). Therefore, the overall accuracy is less than 1 foot with less than 10 degrees of vehicle pitch and/or roll and less than 1.5 feet at 30 degrees pitch and/or roll which is significantly higher (i.e., more than twice as accurate) than current radar altimeters. This is exceptional accuracy compared to existing radar altimeters and meets the demanding requirements for critical applications as discussed above.

While the invention has been described in terms of various specific embodiments, those skilled in the art will recognize that the invention can be practiced with modification within the spirit and scope of the claims.

What is claimed is:

1. A method of reducing ground return signal errors affecting an accuracy of a radar altimeter, said method comprising:
   determining errors in an altitude output of the radar altimeter based on time variations of received ground return pulses;
   adjusting operating parameters of the radar altimeter to reduce errors, adjusting based on at least one of pitch, roll, and pulse width; and
   wherein adjusting operating parameters of the radar altimeter to reduce errors further comprises receiving inertial data, including pitch and roll data, from an inertial measurement unit (IMU) and matching an antenna beamwidth to the inertial data.

2. A method according to claim 1 wherein determining errors in the altitude output of the radar altimeter comprises calculating a loop attenuation according to:

$$\frac{Pr}{Pt} = \frac{Ga^2(0)\lambda^2 \sigma(0)^{\beta(ct/H)}}{(4\pi)^3 H^2 0} \int_0^{2\pi} \int [fant(\theta p, \theta r)]^2 \sigma o(\beta)\sin(\beta)\cos(\beta) d\psi d\beta$$

where:
   β is an angle of incidence,
   Pr is a power at the receiver,
   Pt is a transmit power,
   λ is a wavelength,
   H is a height (i.e., altitude),
   σ(0) is a scattering coefficient at vertical incidence,
   σo(β) is a scattering coefficient, normalized [σ(β) =σ(0) σo(β)] fant(θp,θr) is a normalized antenna pattern,
   Ga(0) is an antenna boresight gain,
   ψ is an Azimuth location angle,
   c is a velocity of propagation,
   t is a time from the very first nadir return's arrival at the receive antenna.

3. A method according to claim 2 wherein determining errors in the altitude output of the radar altimeter comprises calculating a loop attenuation according to the equation for a plurality of altitudes, attitudes, reflection coefficients, transmit pulse widths, and antenna patterns.

4. A method according to claim 2 wherein adjusting operating parameters of the radar altimeter to reduce errors, adjusting based on at least one of pitch, roll, and pulse width, comprises applying a receiver gain that corresponds to the calculated loop attenuation at at least one of a specific altitude, attitude, reflection coefficient, transmit pulse width, and antenna pattern.

5. A method according to claim 1 wherein adjusting operating parameters of the radar altimeter to reduce errors further comprises receiving inertial data, including pitch and roll data, from an IMU and steering the beamwidth of an antenna based on the inertial data.

6. A radar altimeter comprising
a processing device configured to adjust operating parameters of said radar altimeter, based on at least one of varying pulse widths of transmit pulses, varying vehicle attitudes, and varying vehicle altitudes, to reduce ground return signal errors; and
wherein said processing device configured to adjust operating parameters of said radar altimeter is further configured to receive inertial data, including pitch and roll data, from an inertial measurement unit (IMU) and match an antenna beamwidth to the inertial data.

7. A radar altimeter according to claim 6 wherein said processing device configured to adjust operating parameters of said radar altimeter is further configured to calculate a loop attenuation according to:

$$\frac{Pr}{Pt} = \frac{Ga^2(0)\lambda^2 \sigma(0)^{\beta(ct/H)}}{(4\pi)^3 H^2 0} \int_0^{2\pi} \int [fant(\theta p, \theta r)]^2 \sigma o(\beta) \sin(\beta)\cos(\beta) d\psi d\beta$$

where:
$\beta$ is an angle of incidence,
Pr is a power at the receiver,
Pt is a transmit power,
$\lambda$ is a wavelength,
H is a height (i.e., altitude),
$\sigma(0)$ is a scattering coefficient at vertical incidence,
$\sigma o(\beta)$ is a scattering coefficient, normalized [$\sigma(\beta) = \sigma(0) \sigma o(\beta)$] fant($\theta p, \theta r$) is a normalized antenna pattern,
Ga(0) is an antenna boresight gain,
$\psi$ is an Azimuth location angle,
c is a velocity of propagation,
t is a time from the very first nadir return's arrival at the receive antenna.

8. A radar altimeter according to claim 7 wherein said processing device configured to adjust operating parameters of said radar altimeter is further configured to calculate a loop attenuation according to the equation for a plurality of altitudes, attitudes, reflection coefficients, transmit pulse widths, and antenna patterns.

9. A radar altimeter according to claim 7 wherein said processing device configured to adjust operating parameters of said radar altimeter, based on at least one of varying pulse widths of transmit pulses, varying vehicle attitude, and varying vehicle altitude, further comprises said processing device configured to apply a receiver gain that corresponds to the calculated loop attenuation at at least one of a specific altitude, attitude, reflection coefficient, transmit pulse width, and antenna pattern.

10. A radar altimeter according to claim 6 wherein said processing device configured to adjust operating parameters of said radar altimeter is further configured to receive inertial data, including pitch and roll data, from an inertial measurement unit (IMU) and steer the beamwidth of an antenna based on the inertial data.

11. A processing device configured to reduce ground return signal errors of a radar altimeter, said processing device configured to adjust operating parameters of the radar altimeter based on at least one of varying pulse widths of transmit pulses, varying vehicle attitudes, and varying vehicle altitudes, wherein adjusting operating parameters of the radar altimeter to reduce errors further comprises matching a bandwidth of a receiver of the radar altimeter with a pulse width of the radar altimeter; and
wherein adjusting operating parameters of the radar altimeter further comprises receiving inertial data, including pitch and roll data, from an inertial measurement unit (IMU) and matching an antenna beamwidth to the inertial data.

* * * * *